US009967443B2

United States Patent
Shiraishi et al.

(10) Patent No.: US 9,967,443 B2
(45) Date of Patent: May 8, 2018

(54) IMAGING DEVICE COMPRISING A FIRST CASE, A SUBSTRATE, AND A SECOND CASE

(71) Applicant: J.S.T. MFG. CO., LTD., Osaka-shi (JP)

(72) Inventors: Makoto Shiraishi, Miyoshi (JP); Hiroshi Yamada, Miyoshi (JP)

(73) Assignee: J.S.T. MFG. CO., LTD, Osaka-shi (JP)

( * ) Notice: Subject to any disclaimer, the term of this patent is extended or adjusted under 35 U.S.C. 154(b) by 0 days. days.

(21) Appl. No.: 15/286,899

(22) Filed: Oct. 6, 2016

(65) Prior Publication Data

US 2017/0126945 A1 May 4, 2017

(30) Foreign Application Priority Data

Oct. 30, 2015 (JP) .................................. 2015-214252

(51) Int. Cl.
*H04N 5/225* (2006.01)
*H01R 13/26* (2006.01)
(Continued)

(52) U.S. Cl.
CPC ......... *H04N 5/2257* (2013.01); *H01R 13/112* (2013.01); *H01R 13/26* (2013.01); *H01R 13/64* (2013.01); *H04N 5/2252* (2013.01); *H04N 5/2253* (2013.01); *H04N 5/2254* (2013.01); *H01R 12/712* (2013.01)

(58) Field of Classification Search
CPC .. H04N 5/2257; H04N 5/2252; H04N 5/2253; H04N 5/2254; H01R 13/112; H01R 13/26; H01R 13/64; H01R 12/712
See application file for complete search history.

(56) References Cited

U.S. PATENT DOCUMENTS

2013/0293771 A1 11/2013 Mori
2016/0142635 A1* 5/2016 Kaneko .................... G03B 5/00
348/208.11
(Continued)

FOREIGN PATENT DOCUMENTS

JP 2011-46331 A1 3/2011
JP 2013-210480 * 10/2013 .......... H04N 5/2251
JP 2013-210480 A1 10/2013

*Primary Examiner* — Tuan Ho
(74) *Attorney, Agent, or Firm* — Kratz, Quintos & Hanson, LLP (57) ABSTRACT

An imaging device includes: a first case having an opening; a substrate where a first terminal electrically connected with an imaging element is mounted, the substrate being provided in the first case; and a second case closing the opening. The second case includes an accommodation portion accommodating a second terminal designed to be electrically connected with the first terminal. A mating portion capable of being mated with the accommodation portion is secured to the substrate. Inside the mating portion, the first terminal extends along a mating direction of the accommodation portion and the mating portion. The first and second terminals are designed to come into contact with each other while sliding along the mating direction in a mating process of the accommodation portion and the mating portion, and to be elastically deformable in a first direction orthogonal to the mating direction upon contact with each other in the mating process.

5 Claims, 6 Drawing Sheets

(51) Int. Cl.
*H01R 13/64* (2006.01)
*H01R 13/11* (2006.01)
*H01R 12/71* (2011.01)

(56) References Cited

U.S. PATENT DOCUMENTS

2016/0165115 A1* 6/2016 Nakada ................ H04N 5/2251
 348/374
2016/0349528 A1* 12/2016 Kishine .................... G03B 5/00

* cited by examiner

IMAGING DEVICE COMPRISING A FIRST CASE, A SUBSTRATE, AND A SECOND CASE

BACKGROUND OF THE INVENTION

The present invention relates to an imaging device including a substrate on which an imaging element is mounted.

Japanese Unexamined Patent Publication No. 2013-210480 discloses an imaging device to be mounted on a vehicle or the like. The imaging device includes a camera case and a substrate accommodated in the camera case. The camera case is structured by: a front case to which a protector protecting a lens is attached; and a rear case with which an external connector is mated. The external connector includes: a plurality of terminals provided at leading ends of cables; and a connector housing accommodating these terminals. A female terminal electrically connected to an imaging element is mounted on the substrate accommodated in the camera case. The female terminal is accommodated in an accommodation housing secured to the substrate. The rear case includes a male terminal and a mating housing. One end portion of the male terminal is electrically connected with the terminals of the external connector, and the other end portion of the male terminal is electrically connected with the female terminal mounted on the substrate. The mating housing is configured to be mated with the accommodation housing. From the bottom portion of the mating housing, the other end portion of the male terminal projects. Mating of the accommodation housing and the mating housing with each other brings the female terminal and the male terminal into contact with each other to establish electrical connection. As a result, the external connector is electrically connected with the imaging element.

SUMMARY OF THE INVENTION

In the imaging device described in the above document, the female terminal mounted on the substrate is designed to be elastically deformable, upon contact with the male terminal, in an orthogonal direction orthogonal to a mating direction in which the accommodation housing and the mating housing are mated with each other. However, the male terminal is not elastically deformable in the orthogonal direction. If the imaging device is subjected to vibration and/or shock, there is a possibility that the vibration and/or shock is not sufficiently absorbed by the elastic deformation of the female terminal only, which may separate the female terminal and the male terminal from each other in the orthogonal direction, leading to a contact failure.

Further, because the rear case and the external connector are separate members, the device has a larger size in the mating direction, which increases its weight. Moreover, rattle between components is more likely to be caused. Because of this, if the imaging device is subjected to vibration and/or shock, connection between terminals is also subjected to a large vibration and/or shock. This reduces reliability of the electrical connection between terminals. Further, in this arrangement, not only the number of parts, but also the number of contact parts between terminals are large (the contact part between the female terminal on the substrate with the male terminal in the rear case and the contact part between the male terminal in the rear case with the terminals of the external connector). As a result, the reliability of the electrical connection between terminals is reduced.

In view of the above, an object of the present invention is to provide an imaging device capable of improving reliability of the electrical connection between terminals.

According to an embodiment of the present invention, an imaging device includes: a first case to which at least one of a lens member and a protector protecting the lens member is attached, the first case having an opening provided to face the at least one of the lens member and the protector attached to the first case; a substrate on which a first terminal electrically connected with an imaging element is mounted, the substrate being provided in the first case; and a second case closing the opening of the first case. The second case includes: an opposed portion having an opposed surface opposed to the substrate; an accommodation portion projecting from the opposed surface and accommodating a second terminal designed to be electrically connected with the first terminal; and a support portion supporting a cable provided with the second terminal at its leading end portion. A mating portion capable of being mated with the accommodation portion is secured to the substrate; the first terminal extends, inside the mating portion, along a mating direction in which the accommodation portion and the mating portion are mated with each other; and the first and second terminals are designed to come into contact with each other while sliding along the mating direction in a mating process of the accommodation portion and the mating portion, and to be elastically deformable in a first direction orthogonal to the mating direction upon contact with each other in the mating process.

In the present invention, it is preferable that the first terminal is a fork-type terminal including a pair of contact pieces spaced apart from each other in the first direction.

Further, in the present invention, it is preferable that the accommodation portion includes a pair of first restriction walls located close to and to be opposed to at least one of the contact pieces of the first terminal in a second direction when the accommodation portion is mated with the mating portion, the second direction being orthogonal to the mating direction and to the first direction.

Furthermore, in the present invention, it is preferable that the mating portion includes a pair of second restriction walls located close to and to be opposed to the second terminal in the first direction when the mating portion is mated with the accommodation portion.

In the imaging device of the present invention, when the imaging device is subjected to vibration and/or shock, the first and second terminals are elastically deformable in the first direction. Because of this, vibration and/or shock in between the terminals is/are absorbed successfully as compared with the case where only one of the terminals is elastically deformable in the first direction. This improves reliability of the electrical connection between the first terminal and the second terminal. Further, the second case accommodates the second terminal connected with the cable, and therefore also functions as a connector housing. This reduces rattle between components as compared with the case where the second case and the connector are separate members. In addition, downsizing in the mating direction is achievable for weight reduction. As a result, the vibration and/or impact producible between the first and second terminals is/are also reduced, and the reliability of the electrical connection between the first and second terminals is improved. In addition, the above arrangement enables decrease in the number of contact parts between terminals, further improving the reliability of the electrical connection between the first and second terminals. Furthermore, because the second case also functions as the connector housing, the number of parts is reducible as compared with the case where the second case and the connector are separate members.

DESCRIPTION OF THE PREFERRED EMBODIMENTS

Figure 1:
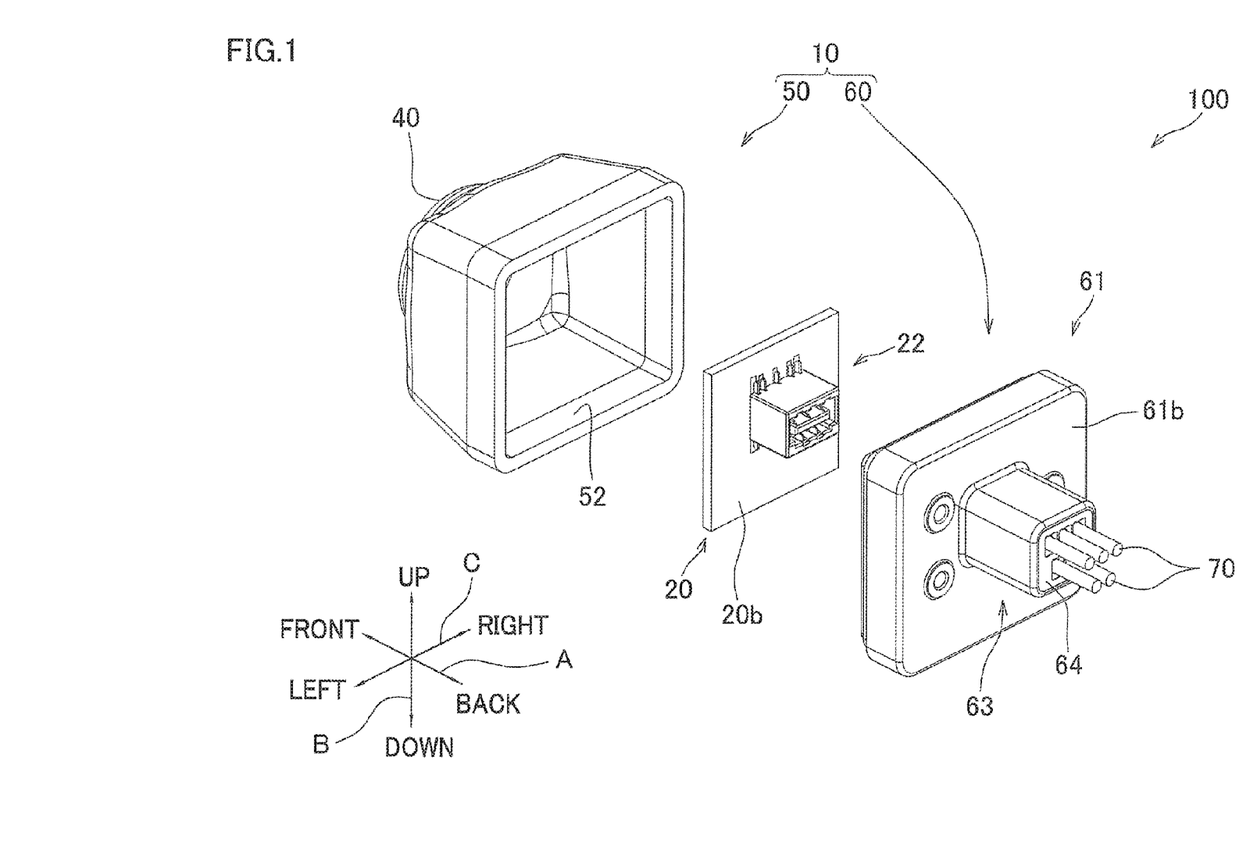
FIG. 1 is an exploded perspective view of an imaging device of an embodiment of the present invention, and shows the imaging apparatus viewed from the back.
Figure 2:
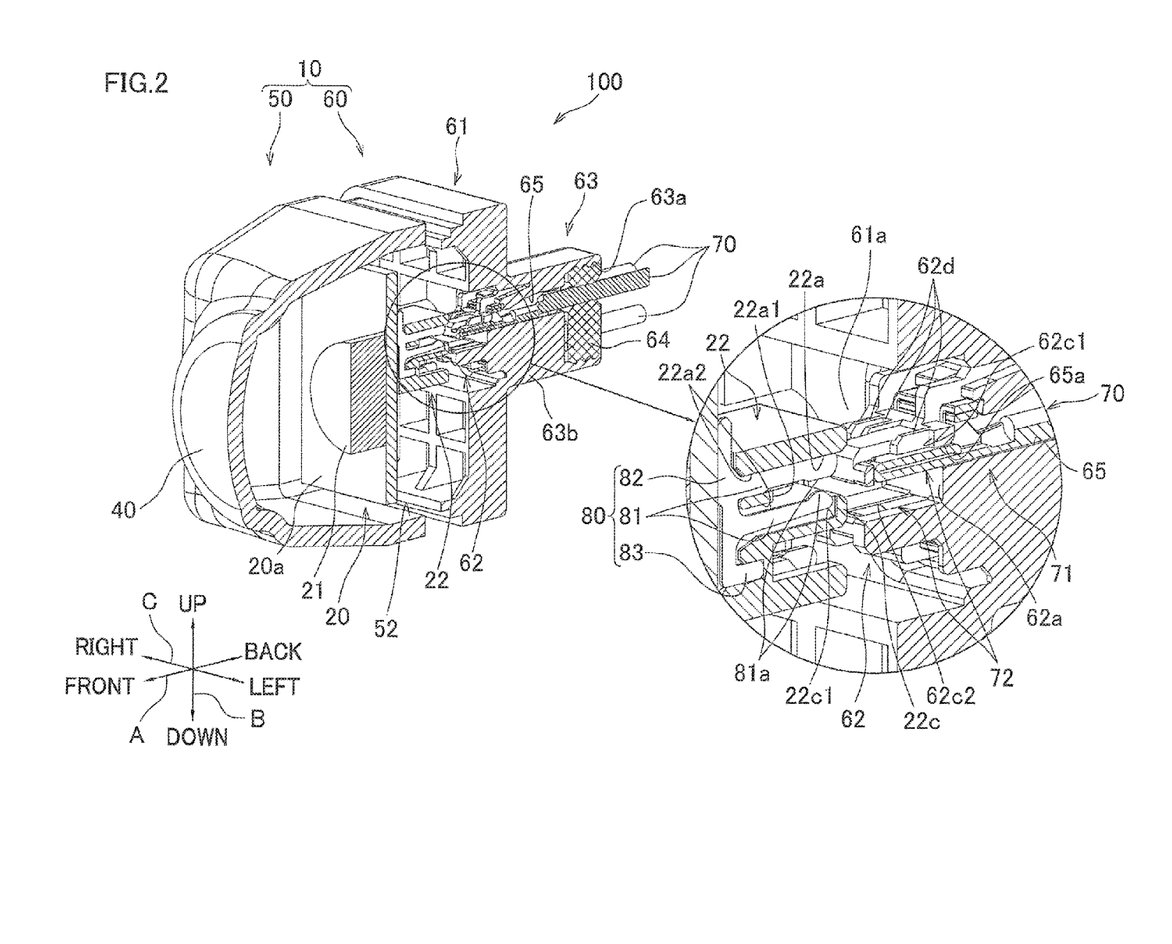
FIG. 2 is a cross-sectional perspective view of the imaging device shown in FIG. 1 with a front case and a rear case separated from each other.

As shown in FIG. 1 and FIG. 2, an imaging device 100 of an embodiment of the present invention includes a camera case 10 and a substrate 20 accommodated in the camera case 10. To the substrate 20, a lens member 21 including at least one lens is attached, as shown in FIG. 2. Further, five female terminals 80 functioning as a first terminal are mounted on the substrate 20. The imaging device 100 is to be mounted on a vehicle or the like to capture an image of the scenery around the vehicle.

[Camera Case]

The camera case 10 includes: a box-shaped front case 50 functioning as a first case; and a rear case 60 functioning as a second case. To the front case 50, a protector 40 protecting the lens member 21 is attached integrally with the front case 50. The front case 50 and the rear case 60 are in contact with each other via a sealing member or the like, and secured to each other by screws, to form a single waterproof camera case. The front case 50 and the rear case 60 are made of resin. For the protector 40, a transparent member made of resin or a transparent film-like member may be used, for example.

<Front Case>

As shown in FIG. 1 and FIG. 2, the protector 40 is provided at a front end portion of the front case 50 integrally with the front case 50. The front case 50 has an opening 52 at its rear end portion. Further, a fixing plate (not illustrated) used to fix the substrate 20 is formed on an inner surface of the front case 50.

<Rear Case>

As shown in FIG. 1 and FIG. 2, the rear case 60 includes: a rear portion 61 functioning as an opposed portion; a front housing 62 functioning as an accommodation portion; and a rear housing 63 functioning as a support portion. The rear portion 61 closes the opening 52 at the rear end portion of the front case 50. The front housing 62 projects frontward, i.e., toward the front case 50, from a front surface 61a of the rear portion 61 that is opposed to the substrate 20. The rear housing 63 projects backward from a rear surface 61b of the rear portion 61. The front housing 62 and the rear housing 63 are formed so as to be opposed to each other in a front-back direction A across the rear portion 61.

A recess 63a opening to the back is formed in the rear housing 63. In the rear case 60, five through holes 65 each extending in the front-back direction A are bored through the rear housing 63 (specifically, a bottom 63b of the recess 63a), the rear portion 61, and the front housing 62. Five cables 70 inserted through the recess 63a are disposed in these through holes 65, respectively. Thus, the rear housing 63 supports the five cables 70.

As shown in FIG. 2, a male terminal 71 functioning as a second terminal is attached to the leading end of each cable 70. The male terminal 71 is formed by bending a metal plate. The male terminal 71 is in contact with core wires (not illustrated) of the cable 70, and thereby electrically connected with the core wires. Further, the male terminal 71 has a contact portion 72 formed by bending the metal plate back 180 degrees so as to have two parts apart from each other in an up-down direction B and parallel to each other along the front-back direction A. A sealing member 64 is disposed in the recess 63a to fill a vacancy around the five cables 70 inside the inner circumferential surface of the recess 63a.

Figure 3A:
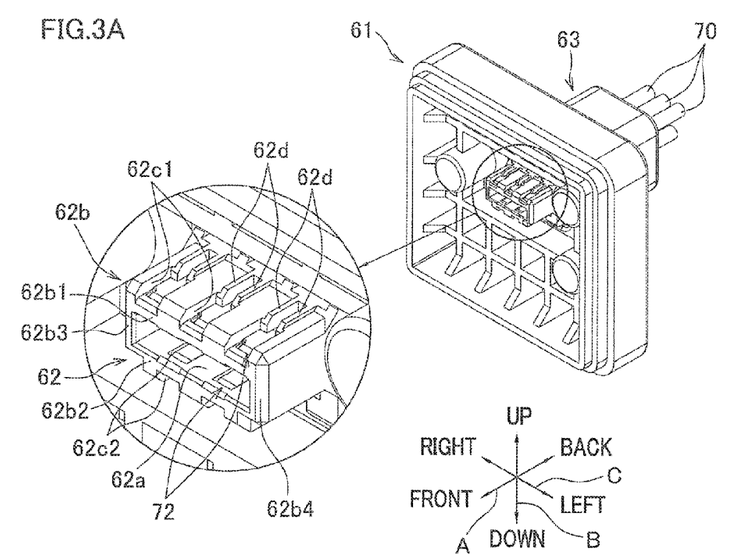
FIG. 3A is a perspective view of the rear case shown in FIG. 1, viewed from the front.
Figure 3B:
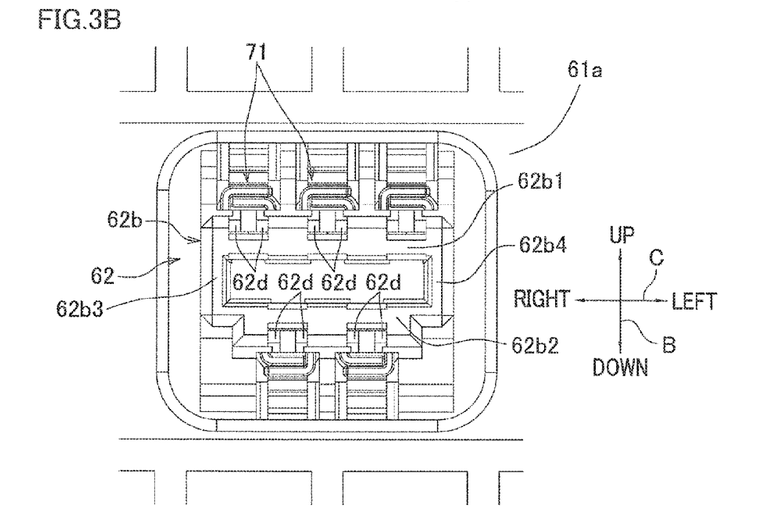
FIG. 3B is an enlarged front view of the rear case.

As shown in FIG. 3A and FIG. 3B, the front housing 62 has an annular wall 62b defining a recess 62a opening to the front. The annular wall 62b is structured by: an upper wall 62b1 and a lower wall 62b2 extending in a left-right direction C; and two side walls 62b3 and 62b4 extending in the up-down direction B. The side walls 62b3 and 62b4 respectively connect right end portions and left end portions of the upper wall 62b1 and the lower wall 62b2, i.e., connect the both end portions in the left-right direction C of the upper and lower walls. At base end portions of the upper wall 62b1 and the lower wall 62b2, respective front portions 65a of the five through holes 65 (see FIG. 2) are formed. In the front portions 65a, the male terminals 71 are disposed, respectively. Through the upper wall 62b1, three through holes are formed respectively in front of three of the front portions 65a. Each of the through holes opens upward and downward, i.e., has two openings 62c1 aligned vertically. The contact portion 72 of the male terminal 71 in the two vertically-aligned openings 62c1 is not covered with the upper wall 62b1 to be exposed. Through the lower wall 62b2, two through holes are formed respectively in front of two of the front portions 65a. Each of the through holes opens upward and downward, i.e., has two openings 62c2 aligned vertically. The contact portion 72 of the male terminal 71 in the two vertically-aligned openings 62c2 is not covered with the lower wall 62b2 to be exposed. Each of the upper wall 62b1 and the lower wall 62b2 is provided with pairs of first restriction walls 62d each arranged in the left-right direction so as to respectively correspond to the vertically-aligned pairs of openings 62c1 or 62c2.

Figure 5A:
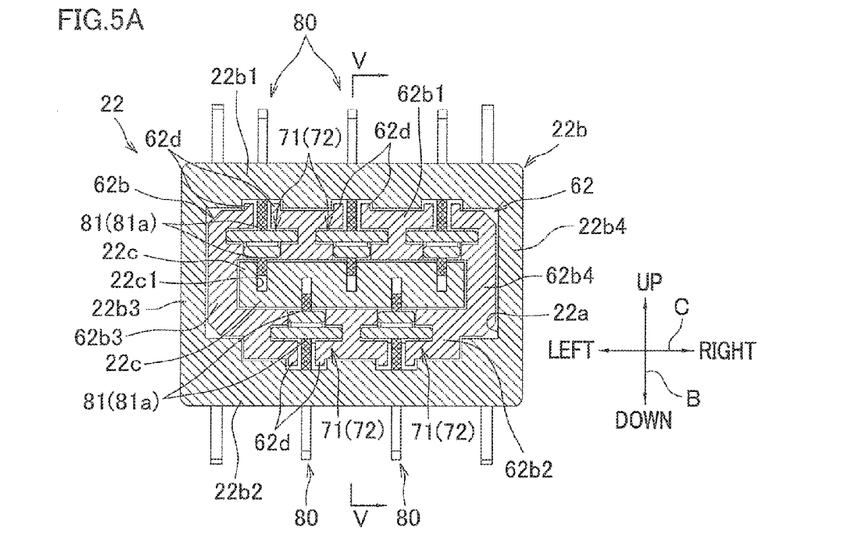
FIG. 5A is a cross section of the imaging device in which the substrate housing is mated with a housing projecting from the front surface of the rear case (front housing), taken orthogonally to a mating direction of these housings.
Figures 5B, 5C:
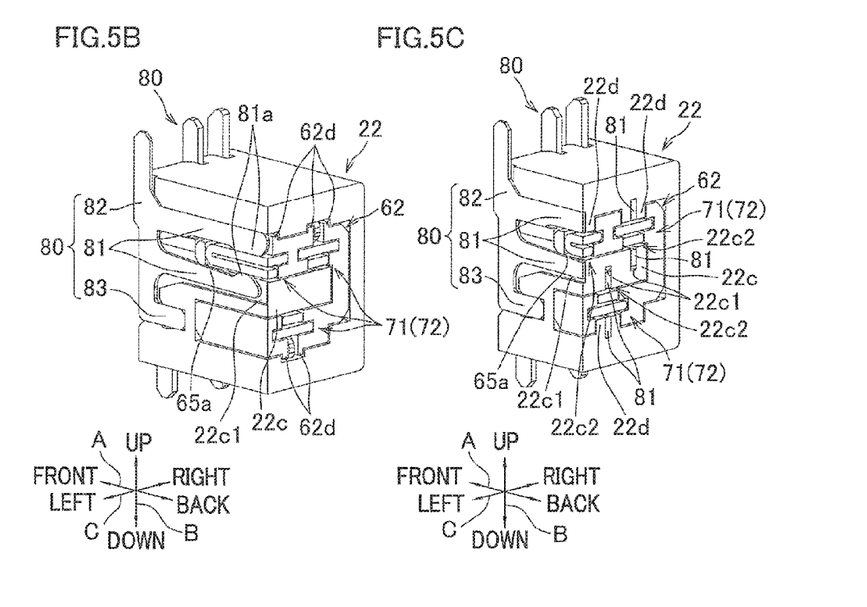
FIG. 5B is a cross section taken along a line V-V shown in FIG. 5A.
FIG. 5C is a cross section cut along a plane shifted forward from the cross section of the housings shown in FIG. 5B.

Each first restriction wall 62d extends, in the opening 62c1 or 62c2, from the rear end of the opening 62c1 or 62c2 to the center thereof in the front-back direction A. Each first restriction wall 62d is provided to be opposed to the corresponding male terminal 71 in the up-down direction B. Further, the distance in the left-right direction C between the first restriction walls 62*d* in each pair is slightly longer than the thickness, in the left-right direction C, of each contact piece 81 of the corresponding female terminal 80. The contact piece 81 will be described later. Because of this, when the front housing 62 and a substrate housing 22 (will be described later) are mated with each other, each pair of first restriction walls 62*d* are located to sandwich one of the contact pieces 81 in the left-right direction C, and located close to and to be opposed to the one of the contact pieces 81, as shown in FIG. 5A and FIG. 5B. Further, when the front housing 62 and the substrate housing 22 are mated with each other, each of the pair of first restriction walls 62*d* is located to be opposed to the contact portion 72 of the corresponding male terminal 71 in the up-down direction B. This prevents the contact pieces 81 of the female terminal 80 from shifting to a position where the contact between the contact pieces 81 and the corresponding contact portion 72 of the male terminal 71 is lost, when the imaging device 100 is subjected to vibration in the left-right direction C. Thus, reliability of the electrical connection between the female terminals 80 and the male terminals 71 is improved.

[Substrate]

Figure 4A:
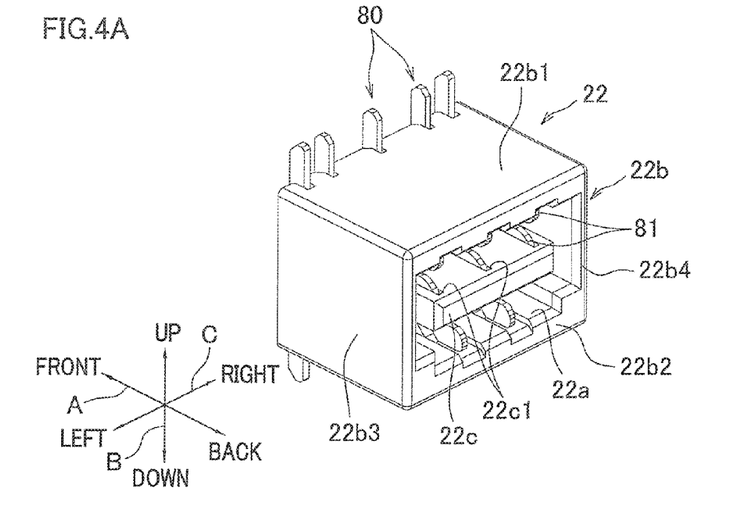
FIG. 4A is a perspective view of a housing secured to a substrate shown in FIG. 1 (substrate housing), viewed from the back.
Figure 4B:
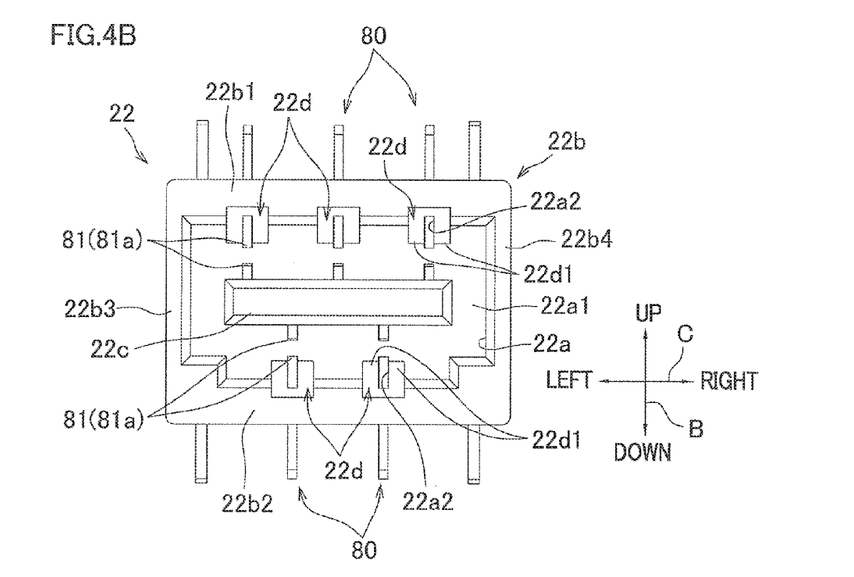
FIG. 4B is an enlarged front view of the substrate housing.

An imaging element (not shown) is mounted on a front surface 20*a* of the substrate 20. Examples of the imaging element include a charge-coupled device (CCD) and a complementary metal oxide semiconductor (CMOS). Further, as shown in FIG. 2, the lens member 21 is attached to the front surface 20*a* of the substrate 20. As shown in FIG. 1, the substrate housing 22 projecting toward the rear case 60 is secured to a rear surface 20*b* of the substrate 20. As shown in FIG. 4A and FIG. 4B, the substrate housing 22 functioning as a mating portion has a recess 22*a* opening backward, i.e., toward the rear case 60. The substrate housing 22 accommodates five female terminals 80 mounted on the rear surface 20*b* of the substrate 20.

Each of the female terminals 80 functioning as the first terminal is a fork type terminal with a uniform thickness formed by stamping a metal plate. As shown in FIG. 2, each female terminal 80 has a pair of contact pieces 81, a connecting piece 82, and a fixing piece 83. The pair of contact pieces 81 are apart from each other in the up-down direction B. Further, the pair of contact pieces 81 extend in the front-back direction A. The contact pieces 81 are respectively inserted into holes 22*a*2 formed through a bottom wall 22*a*1 of the recess 22*a*, and project backward from the bottom wall 22*a*1. In this embodiment, one of the pair of contact pieces 81, i.e., the upper contact piece in an enlarged view of FIG. 2 ("first piece"), is slightly longer than the other, i.e., the lower contact piece in the enlarged view of FIG. 2 ("second piece"). Each pair of contact pieces 81 respectively have, at leading end portions, i.e., rear end portions thereof, a pair of contact portions 81*a* projecting toward each other. The connecting piece 82 extends in the up-down direction B, and is connected with front end portions of the pair of contact pieces 81. This makes the leading end portions or the rear end portions of the pair of contact pieces 81 movable in the up-down direction B. That is to say, this makes the pair of contact pieces 81 elastically deformable. The fixing piece 83 is connected with a lower end of the connecting piece 82. The fixing piece 83 is provided to fix the female terminal 80 to the substrate housing 22. The connecting piece 82 of the female terminal 80 is electrically connected to the imaging element mounted on the substrate 20 through not-illustrated wiring on the substrate 20.

The substrate housing 22 has an annular wall 22*b* defining the recess 22*a*. The annular wall 22*b* is structured by: an upper wall 22*b*1 and a lower wall 22*b*2 extending in the left-right direction C; and two side walls 22*b*3 and 22*b*4 extending in the up-down direction B. The side walls 22*b*3 and 22*b*4 respectively connect right end portions and left end portions of the upper wall 22*b*1 and the lower wall 22*b*2, i.e., connect the both end portions in the left-right direction C of the upper and lower walls. As shown in FIG. 4B, the substrate housing 22 has five support portions 22*d* each supporting a base end portion i.e., a front portion of the first piece of the contact pieces 81 of the corresponding female terminal 80. Each support portion 22*d* is structured by a pair of support pieces 22*d*1 each having a substantially rectangular parallelepiped shape and projecting backward from a position near the corresponding hole 22*a*2 of the bottom wall 22*a*1. The pair of support pieces 22*d*1 support one of the pair of contact piece 81, i.e., the first contact piece, while sandwiching the first contact piece in the left-right direction C. Out of the five support portions 22*d*, three support portions 22*d* at an upper stage are located at the corner between the upper wall 22*b*1 and the bottom wall 22*a*1, apart from one another in the left-right direction C. Out of the five support portions 22*d*, two support portions 22*d* at a lower stage are located at the corner between the lower wall 22*b*2 and the bottom wall 22*a*1, apart from each other in the left-right direction C.

As shown in FIG. 2, FIG. 4A, and FIG. 4B, the substrate housing 22 has a projection 22*c* projecting backward from the center of the bottom wall 22*a*1 of the recess 22*a*. The projection 22*c* has a substantially rectangular parallelepiped shape capable of being fitted in the recess 62*a* of the front housing 62. On top and under surfaces of the projection 22*c*, there are formed five grooves 22*c*1 each accommodating the second piece of the contact pieces 81 of the corresponding female terminal 80. Each groove 22*c*1 extends in the front-back direction A. As shown in FIG. 2, each groove 22*c*1 is formed to have a size which allows the second piece of the contact pieces 81 of the corresponding female terminal 80 to move in the up-down direction B as a result of elastic deformation. In other words, each groove 22*c*1 is formed to cause the second piece to be apart from the bottom surface of the groove 22*c* 1 in the up-down direction B before mating.

Further, in this embodiment, each support portion 22*d* and an opposed part 22*c*2 of the projection 22*c* that is opposed to the support portion 22*d* structures a pair of second restriction walls. As shown in FIG. 5C, when the front housing 62 and the substrate housing 22 are mated with each other, the pair of second restriction walls structured by the support portion 22*d* and the opposed part 22*c*2 are located to sandwich the contact portion 72 of the male terminal 71 in the up-down direction B, and are located close to and to be opposed to the contact portion 72. Furthermore, in this embodiment, the device is designed so that the total sum of (i) the distance in the up-down direction B between the support portion 22*d* and the male terminal 71 when the front housing 62 and the substrate housing 22 are mated with each other and (ii) the distance in the up-down direction B between the opposed part 22*c*2 and the male terminal 71 in this mating state is smaller than the maximum distance of the movement of the pair of contact pieces 81 of the female terminal 80 caused by elastic deformation. With this arrangement, when the imaging device 100 is subjected to vibration in the up-down direction B, either the support portion 22*d* or the opposed part 22*c*2 contacts the contact portion 72 of the male terminal 71 before a force which can plastically deform the pair of contact pieces 81 of the female terminal 80 is applied through the male terminal 71. This prevents the plastic deformation of the pair of contact pieces 81 of each female terminal 80, and reliability of the electrical connection between the female terminals 80 and the male terminals 71 is improved.

<Assembling Process of Imaging Device>

Figure 6A:
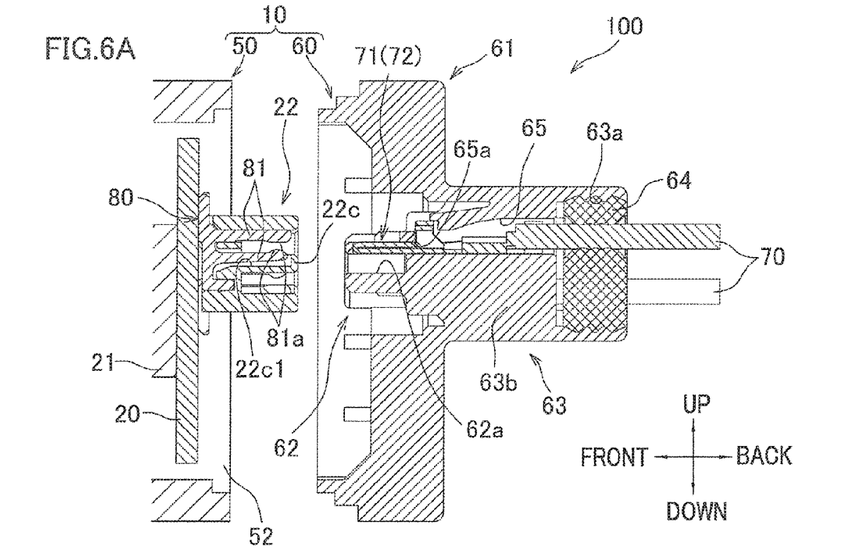
FIG. 6A includes longitudinal sectional views of the front case and the rear case which are not connected with each other.

The following will describe the process of assembling the imaging device. As shown in FIG. 6A, the substrate 20 is put in the front case 50. In this process, the substrate 20 is secured to the front case 50 so that the optical axis of the imaging element mounted on the substrate 20 is coaxial to the optical axis of the protector 40. Further, the five cables 70 are inserted through the recess 63a of the rear case 60, so that the male terminals 71 are accommodated in the front housing 62 and the cables 70 are supported by the rear housing 63. Then, the sealing member 64 is disposed in the recess 63a, to prevent entry of liquid or the like through the vacancy around the five cables 70 in the recess 63a.

Figure 6B:
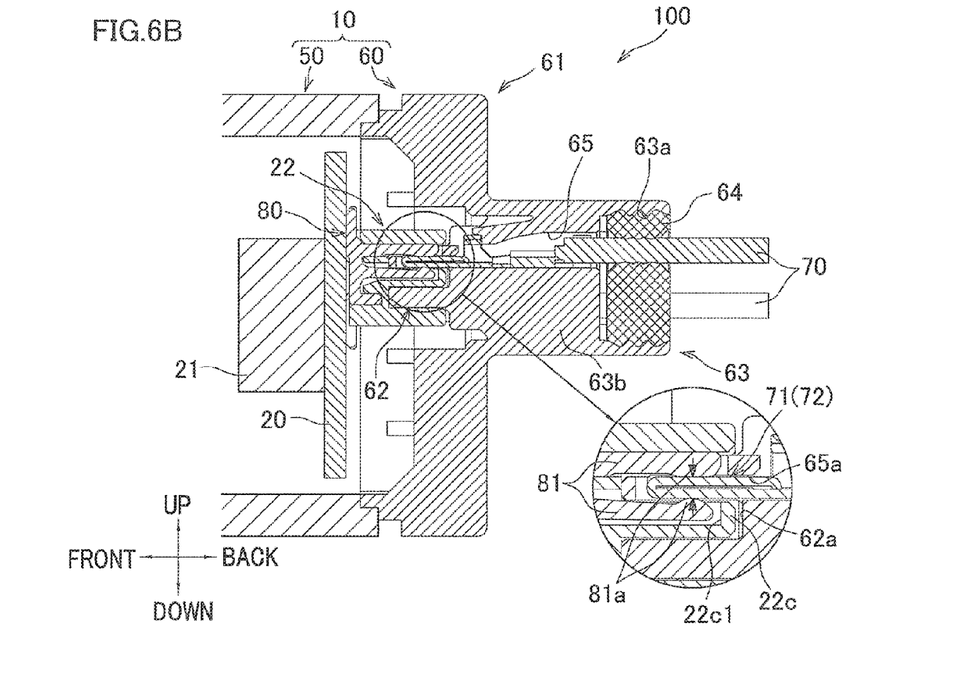
FIG. 6B includes longitudinal sectional views of the front case and the rear case connected with each other, with the substrate housing and the front housing mated with each other.

Subsequently, as shown in FIG. 6B, the front housing 62 is mated with the substrate housing 22, and the opening 52 of the front case 50 is closed by the rear portion 61 of the rear case 60. At this time, parts of the upper wall 62b1 are respectively located in spaces between, in the left-right direction C, the first pieces of the contact pieces 81 of the female terminals 80 at the upper stage. In other words, each of the above-mentioned parts of the upper wall 62b1 is located between the first pieces of the contact pieces of the corresponding two female terminals 80 adjacent to each other at the upper stage. Meanwhile, a part of the lower wall 62b2 is located between, in the left-right direction C, the first pieces of the contact pieces 81 of the two female terminals 80 at the lower stage. In this mating process, each contact portion 81a is brought into contact with the corresponding contact portion 72 of the male terminal 71 through the opening 62c1 or 62c2 while sliding in a mating direction, i.e., a direction parallel to the front-back direction A. Before mated, the distance between the contact portions 81a of each pair of contact pieces 81 is slightly smaller than the thickness of the contact portion 72 of the male terminal 71 in the up-down direction B. Because of this, when the contact portion 72 of the male terminal 71 is inserted between the pair of contact pieces 81, the second piece of the pair of contact pieces 81 which is accommodated in the groove 22c1 is elastically deformed to increase the distance between the contact portions 81a of the pair of contact pieces 81, and the pair of contact pieces 81 holds the contact portion 72 between them as indicated with arrows in FIG. 6B. Further, the contact portion 72 of the male terminal 71 includes two metal plates apart from each other in the up-down direction B. Therefore, held between the pair of contact pieces 81, the contact portion 72 is elastically deformed so that the distance between the metal plates decreases. Thus, each of the female terminals 80 and male terminals 71 is designed to be elastically deformable in the up-down direction B upon contact with each other. As such, the male terminals 71 of the cables 70 are electrically connected with the female terminals 80, and then the imaging element is electrically connected with the cables 70.

Thereafter, the rear portion 61 is secured to the front case 50 by screws. Thus, assembling of the imaging device 100 is completed.

<Advantageous Effects of this Embodiment>

In the imaging device 100 of the present embodiment, when the imaging device 100 is subjected to vibration and/or shock, both the female terminals 80 and the male terminals 71 are elastically deformable in the up-down direction B. Because of this, vibration and/or shock in between the female terminals 80 and the male terminals 71 is/are absorbed more successfully than in the case where either the female terminals or the male terminals are elastically deformable. Thus, reliability of the electrical connection between the female terminals 80 and the male terminals 71 is improved.

Further, the rear case 60 accommodates therein the male terminals 71 provided at the leading ends of the cables 70. That is to say, the rear case 60 also functions as a connector housing. This reduces rattle between components as compared with the case where the rear case 60 and a connector are separate members. In addition, downsizing in the mating direction (front-back direction A) is achievable for weight reduction. As a result, vibration and/or impact between the female terminals 80 and the male terminals 71 is/are reduced, and the reliability of the electrical connection between the female terminals 80 and the male terminals 71 is improved. In addition, if the rear case 60 and the connector are separate members, the rear case has to be provided with terminals to be electrically connected with terminals of the connector. In this embodiment, however, the rear case 60 also functions as the connector housing, and therefore the number of contact parts between terminals is reducible. Thus, reliability of the electrical connection between the female terminals 80 and the male terminals 71 is improved. Furthermore, because the rear case 60 also functions as the connector housing, the number of parts is reducible as compared with the case where the rear case 60 and the connector are separate members.

Moreover, because each female terminal 80 is a fork-type terminal, the female terminals 80 have a simple structure.

In addition, the first restriction walls 62d are provided in pairs. This makes it more likely that each first contact piece come into contact with the first restriction walls 62d when the imaging device 100 is subjected to vibration in the left-right direction C. This stabilizes the contacts between the female terminals 80 with the male terminals 71. As a result, reliability of the electrical connection between the female terminals 80 and the male terminals 71 is further improved. In addition, each female terminal 80 is a fork-type terminal. This makes the area of the first contact piece that is received by the pair of first restriction walls 62 relatively larger.

Further, the imaging device 100 of this embodiment includes the pairs of second restriction walls each structured by the support portion 22d and the opposed part 22c2. This makes it more likely that the contact portion 72 of each male terminal 71 comes into contact with the support portion 22d or the opposed part 22c2 when the imaging device 100 is subjected to the vibration in the up-down direction B. This stabilizes the contacts between the female terminals 80 with the male terminals 71. As a result, reliability of the electrical connection between the female terminals 80 and the male terminals 71 is further improved.

<Modifications>

The following describes modifications of the above-described embodiment. In the above-described embodiment, the terminals mounted on the substrate 20 are the female terminals 80, and the terminals provided at the leading ends of the cables 70 are the male terminals 71. However, the male terminals and the female terminals may replace each other. Further, each of the female terminals 80 may be of a type other than the fork-type. Furthermore, the terminal structure of the female terminals 80 and the male terminals 71 is not limited as long as each of the terminals is elastically deformable in a direction orthogonal to the mating direction upon contact with the counterpart terminal.

The pair(s) of first restriction walls 62d and the pair(s) of second restriction walls do not have to be provided. Further, when the front housing 62 and the substrate housing 22 are mated with each other, each pair of first restriction walls 62d do not have to be located close to one of the contact pieces 81 of the corresponding female terminal 80 in the left-right direction C. Furthermore, when the front housing 62 and the substrate housing 22 are mated with each other, the support portion 22d and the opposed part 22c2 of the projection 22c functioning as each pair of second restriction walls do not have to be located close to the corresponding contact portion 72 of the male terminal 71 in the up-down direction B.

The above-described embodiment deals with the case where the lens member 21 is attached to the substrate 20; however, the lens member 21 may be attached to the front end portion of the front case 50 in place of the protector 40. In this case, a lens member with a protector may be provided at the front end portion of the front case 50. Further, the above-described embodiment may be modified such that two lens members are used: one of which may be attached to the substrate 20; and the other of which may be attached to the front end portion of the front case 50. The above-described embodiment may be further modified such that: the protector 40 is provided at the front end portion of the front case 50; and the lens member is attached to the front case 50 to be located in the front case 50. Still further, the protector 40 and the front case 50 may be separate members. In addition to the above, the arrangements (e.g., shapes and materials) of the lens member and the protector may be different from those described in the above-described embodiment.

Further, the number of positions in the rear case 60, which is 5 in the above-described embodiment, is changeable.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An imaging device comprising:
  a first case to which at least one of a lens member and a protector protecting the lens member is attached, the first case having an opening provided to face the at least one of the lens member and the protector attached to the first case;
  a substrate on which a first terminal electrically connected with an imaging element is mounted, the substrate being provided in the first case; and
  a second case closing the opening of the first case,
  the second case including: an opposed portion having an opposed surface opposed to the substrate; an accommodation portion projecting from the opposed surface and accommodating a second terminal designed to be electrically connected with the first terminal; and a support portion supporting a cable provided with the second terminal at its leading end portion, wherein:
  a mating portion capable of being mated with the accommodation portion is secured to the substrate;
  the first terminal extends, inside the mating portion, along a mating direction in which the accommodation portion and the mating portion are mated with each other; and
  the first and second terminals are designed to come into contact with each other while sliding along the mating direction in a mating process of the accommodation portion and the mating portion, and to be elastically deformable in a first direction orthogonal to the mating direction upon contact with each other in the mating process.

2. The imaging device according to claim 1, wherein the first terminal is a fork-type terminal including a pair of contact pieces spaced apart from each other in the first direction.

3. The imaging device according to claim 2, wherein the accommodation portion includes a pair of first restriction walls located close to and to be opposed to at least one of the contact pieces of the first terminal in a second direction when the accommodation portion is mated with the mating portion, the second direction being orthogonal to the mating direction and to the first direction.

4. The imaging device according to claim 1, wherein the mating portion includes a pair of second restriction walls located close to and to be opposed to the second terminal in the first direction when the mating portion is mated with the accommodation portion.

5. The imaging device according to claim 1, wherein:
  an elastically-deformable portion of the first terminal, which is elastically deformable in the first direction in the mating process of the accommodation portion and the mating portion, is apart from the mating portion in the first direction before mating of the accommodation portion and the mating portion, and a distance between the elastically-deformable portion and the mating portion after the mating is smaller than that before mating;
  the second terminal includes two parts which are apart from each other in the first direction and are parallel to each other along the mating direction before the mating of the accommodation portion and the mating portion; and
  one of the two parts of the second terminal, which is configured to come into contact with the elastically-deformable portion of the first terminal in the mating process of the accommodation portion and the mating portion, is elastically deformable in the first direction, and a distance between the two parts after the mating is smaller than that before mating.

* * * * *